US011368532B2

(12) United States Patent
Yang et al.

(10) Patent No.: US 11,368,532 B2
(45) Date of Patent: *Jun. 21, 2022

(54) GROUP-BASED DATA TRANSFER IN MACHINE-TO-MACHINE SYSTEMS

(71) Applicant: Intel Corporation, Santa Clara, CA (US)

(72) Inventors: Shao-Wen Yang, San Jose, CA (US); Lei Yang, Hillsboro, OR (US); Anand P. Rangarajan, Portland, OR (US); Vijay Sarathi Kesavan, Portland, OR (US); Xingang Guo, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,211

(22) Filed: Mar. 30, 2020

(65) Prior Publication Data

US 2021/0021673 A1  Jan. 21, 2021

Related U.S. Application Data

(63) Continuation of application No. 14/975,019, filed on Dec. 18, 2015, now Pat. No. 10,609,146.

(51) Int. Cl.
*G06F 15/16* (2006.01)
*H04L 67/12* (2022.01)
(Continued)

(52) U.S. Cl.
CPC ............ *H04L 67/12* (2013.01); *H04L 12/185* (2013.01); *H04L 12/1895* (2013.01); *H04W 4/08* (2013.01);
(Continued)

(58) Field of Classification Search
None
See application file for complete search history.

(56) References Cited

U.S. PATENT DOCUMENTS 10,609,146 B2 *  3/2020  Yang ..................... H04W 4/38
2014/0359035 A1  12/2014  Wang et al.
(Continued)

FOREIGN PATENT DOCUMENTS

CN  103095605 A  5/2013
CN  103227833 A  7/2013
(Continued)

OTHER PUBLICATIONS

SIPO, First Office Action issued in CN Patent Application No. 201680067506.1, dated Nov. 27, 2020; 25 pages including English translation.

*Primary Examiner* — Yves Dalencourt
(74) *Attorney, Agent, or Firm* — Alliance IP, LLC

(57) ABSTRACT

A particular device is provided with a communications module to receive signals of a plurality of devices within range of the particular device and further provisioned with grouping logic. The grouping logic is executable by one or more processors to determine from each of the signals a respective identifier for each of the plurality of devices, determine, based at least in part on the identifiers, that a particular subset of the plurality of devices are also included with the particular device in a particular one of a plurality of defined groups, and converge data received from the particular subset of devices based on the particular group.

20 Claims, 8 Drawing Sheets

(51) Int. Cl.
*H04W 4/38* (2018.01)
*H04W 4/08* (2009.01)
*H04L 12/18* (2006.01)
*H04W 4/44* (2018.01)
*H04W 4/80* (2018.01)

(52) U.S. Cl.
CPC ............... *H04W 4/38* (2018.02); *H04W 4/44* (2018.02); *H04W 4/80* (2018.02)

(56) References Cited

U.S. PATENT DOCUMENTS

2016/0285935 A1    9/2016  Wu et al.
2017/0094706 A1*   3/2017  Kim ..................... H04L 67/141

FOREIGN PATENT DOCUMENTS

| | | |
|---|---|---|
| CN | 104519493 A | 4/2015 |
| CN | 105027173 A | 11/2015 |
| CN | 105308630 A | 2/2016 |
| WO | 2014125102 A1 | 8/2014 |

* cited by examiner

GROUP-BASED DATA TRANSFER IN MACHINE-TO-MACHINE SYSTEMS

CROSS REFERENCE TO RELATED APPLICATIONS

This application is a continuation (and claims the benefit under 35 U.S.C. § 120) of U.S. application Ser. No. 14/975,019, filed Dec. 18, 2015, entitled "GROUP-BASED DATA TRANSFER IN MACHINE-TO-MACHINE SYSTEMS". The entire disclosure of the prior application is considered part of (and is incorporated by reference in) the disclosure of this application.

TECHNICAL FIELD

This disclosure relates in general to the field of computer systems and, more particularly, to data analytics.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1:
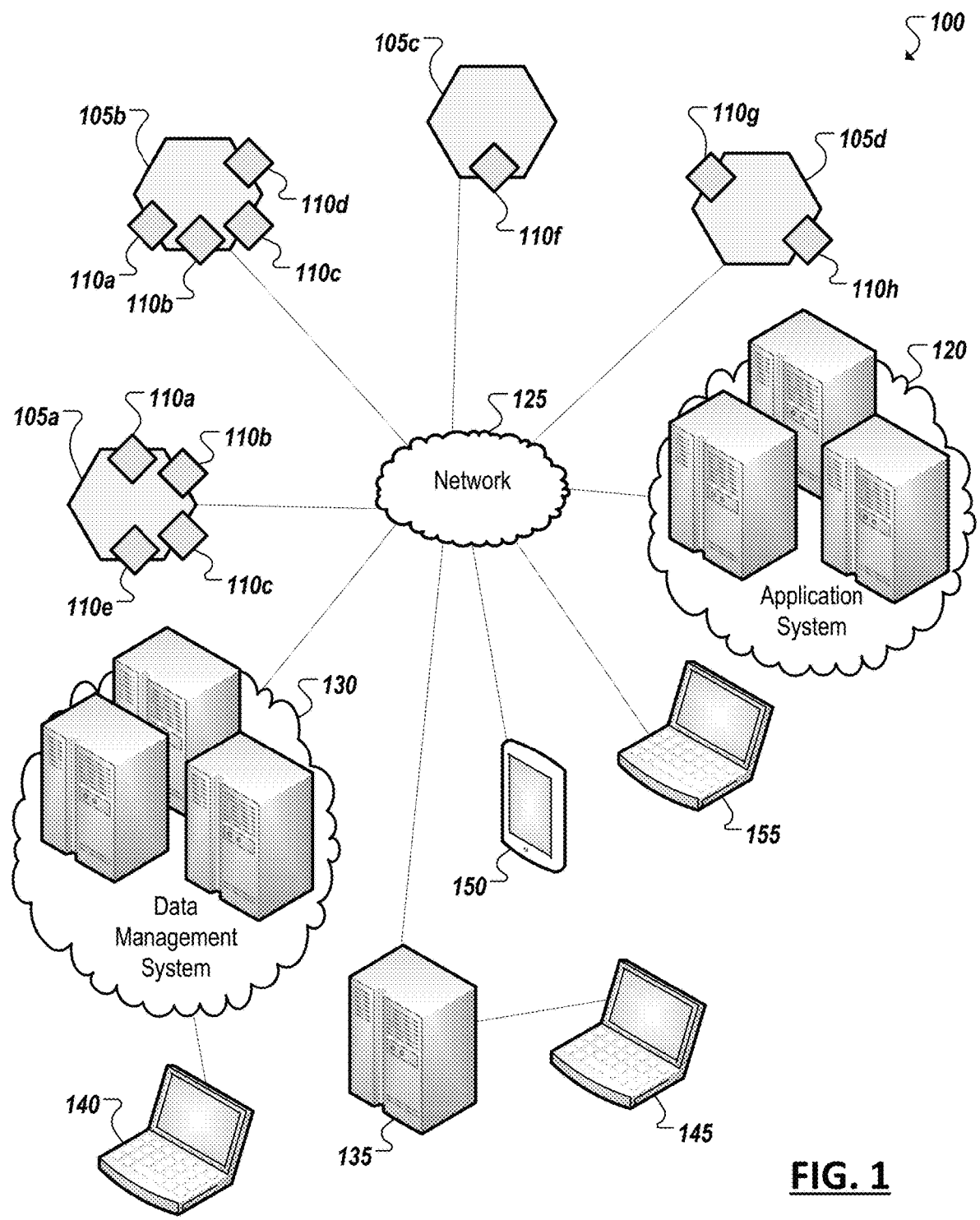
FIG. 1 illustrates an embodiment of a system including multiple sensor devices and an example data management system.

FIG. 1 is a block diagram illustrating a simplified representation of a system 100 that includes one or more sensors devices 105*a-d* deployed throughout an environment. Each device 105*a-d* may include one or more instances of various types of sensors (e.g., 110*a-h*). Sensors are capable of detecting, measuring, and generating sensor data describing characteristics of the environment in which they reside, are mounted, or are in contact with. For instance, a given sensor (e.g., 110*a-h*) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110*a-h*) as described herein, anticipate the development of a potentially limitless universe of various sensors, each designed to and capable of detecting, and generating corresponding sensor data for, new and known environmental characteristics.

In some implementations, sensor devices 105*a-d* and their composite sensors (e.g., 110*a-h*) can be incorporated in and/or embody an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly. Further, IoT systems can often be composed of a complex and diverse collection of connected devices (e.g., 105*a-d*), such as sourced or controlled by varied groups of entities and employing varied hardware, operating systems, software applications, and technologies. Facilitating the successful interoperability of such diverse systems is, among other example considerations, an important issue when building or defining an IoT system.

As shown in the example of FIG. 1, multiple sensor devices (e.g., 105*a-d*) can be provided. A sensor device can be any apparatus that includes one or more sensors (e.g., 110*a-h*). For instance, a sensor device (e.g., 105*a-d*) can include such examples as a mobile personal computing device, such as a smart phone or tablet device, a wearable computing device (e.g., a smart watch, smart garment, smart glasses, smart helmet, headset, etc.), and less conventional computer-enhanced products such as smart appliances (e.g., smart televisions, smart refrigerators, etc.), home or building automation devices (e.g., smart heat-ventilation-air-conditioning (HVAC) controllers and sensors, light detection and controls, energy management tools, etc.), and other examples. Some sensor devices can be purpose-built to host sensors, such as a weather sensor device that includes multiple sensors related to weather monitoring (e.g., temperature, wind, humidity sensors, etc.). Some sensors may be statically located, such as a sensor device mounted within a building, on a lamppost, sign, water tower, secured to a floor (e.g., indoor or outdoor), or other fixed or static structure. Other sensors may monitor environmental characteristics of moving environments, such as a sensor provision in the interior or exterior of a vehicle, in-package sensors (e.g., for tracking cargo), wearable sensors worn by active human or animal users, an aerial, ground-based, or underwater drone among other examples. Indeed, it may be desired that some sensors move within an environment and applications can be built around use cases involving a moving subject or changing environment using such sensors, among other examples.

Some sensor devices (e.g., 105*b,c*) in a collection of the sensor devices, may possess distinct instances of the same type of sensor (e.g., 110*a-c*). For instance, in the particular example illustrated in FIG. 1, each of the sensor devices 105*b* and 105*c* includes a respective instance of sensors 110*a-c*. Other sensor devices (e.g., 105*a-d*) may possess sensors (e.g., 110*d-h*) that are the only instance of that type within an environment during a particular period of time. Further, while one or more sensor devices may share the ability (i.e., provided by a respective instance of a particular sensor) to collect the same type of information, the sensor devices' (e.g., 105*b,c*) respective instances of the common sensor (e.g., 110*a-c*) may differ, in that they are manufactured or calibrated by different entities, generate different data (e.g., different format, different unit measurements, different sensitivity, etc.), or possess different physical characteristics (e.g., age, wear, operating conditions), among other examples. Accordingly, even instances of the same sensor type (e.g., 110*a*) provided on multiple different sensor devices (e.g., 105*b,c*) may operate differently or inconsistently.

Continuing with the example of FIG. 1, in some implementations, one or more systems can control, monitor, and/or consume sensor data generated by a collection of sensor devices (e.g., 105*a-d*). For instance, a server system (e.g., 120) can serve an application or service derived from or otherwise using the sensor data generated by a collection of sensor devices (e.g., 105*a-d*). The server system 120 can consume a data set generated by the collection of sensor devices to provide additional utility and insights through analysis of the data set. Such services might include (among potentially limitless alternative examples) air quality analysis based on multiple data points describing air quality characteristics, building security based on multiple data points relating to security, personal health based on multiple data points describing health characteristics of a single or group of human user(s), traffic analysis, and so on. Sensor data, consumed by the server system 120, can be delivered to the server system 120 over one or more networks (e.g., 125). In other instances, prior to the sensor data being made available for consumption by one or more server systems (e.g., 120), sensor data, generated by a collection of sensor devices (e.g., 105*a-d*) can be aggregated and pre-processed or subsampled by a data management system (e.g., 130) or at the sensor devices (e.g., 105*a-d*) themselves. In some cases, a data management system 130 can be implemented separate from, and even independently of, server systems (e.g., 120) that are to use the data sets constructed by the data management system 130. Data sets (generated from aggregate sensor data by the data management system 130 or one or more of the sensor devices 105*a-d*) can be delivered or otherwise made accessible to one or more server systems (e.g., 120) over one or more networks (e.g., 125). In other implementations, the functionality of data management system 130 can be integrated with functionality of server system 120, allowing a single system to prepare, analyze, and host services from a collection of sensor data sourced from a set of sensor devices, among other examples.

In some implementations, a development system 135 can be provided hosting tools to develop IoT applications according to a programming model that abstracts data flow requirements of the application through the grouping framework described herein. Such tools can assist in simplifying the programming process, lowering the barriers for less expert programmers to develop useful and innovative IoT systems. Such development tools hosted by the development system 135 can include text-based, script-based, graphical, and other programming tools. In some cases, development system 135 can be implemented separate from data management 130 and application systems 120. In other cases, functionality and tools of the development system 135 can be integrated with data management 130 or application systems 120. In other implementations, development system 135 can be implemented as web-based or client-based platform on one or more end user devices (e.g., 145, 150, 155), among other example implementations. Indeed, distinct instances of development system can be implemented locally on each of a plurality of different user devices (e.g., 145, 150, 155) in some implementations.

One or more networks (e.g., 125) can facilitate communication between sensor devices (e.g., 105*a-d*) and systems (e.g., 120, 130, 135) that manage and consume data of the sensor devices, including local networks, public networks, wide area networks, broadband cellular networks, the Internet, and the like. Additionally, computing environment 100 can include one or more user devices (e.g., 140, 145, 150, 155) that can allow users to access and interact with one or more of the applications, data, and/or services hosted by one or more systems (e.g., 120, 130, 135) over a network 125, or at least partially local to the user devices (e.g., 150, 155), among other examples.

In general, "servers," "clients," "computing devices," "network elements," "hosts," "system-type system entities," "user devices," "sensor devices," and "systems" (e.g., 105*a-d*, 120, 130, 135, 140, 145, 150, 155, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

The potential promise of IoT systems is based on the cooperation and interoperation of multiple different smart devices and sensors adding the ability to interconnect potentially limitless devices and computer-enhanced products and deliver heretofore unimagined innovations and solutions. IoT systems characteristically contain a significant number of diverse devices, many different architectures, diverse networks, and a variety of different use cases. Among the challenges for successful deployment of IoT is managing how the various devices share and communicate data within a system. However, determining how these varied devices are to communicate, ex ante, can be a challenge. Additionally, as devices in an M2M/IoT system may communicate predominantly using wireless communication mechanisms, devices in a potential system broadcast their data, including to devices that have no utility or relevance to a particular application. However, it can be similarly difficult for devices to determine which of these devices to ignore and which to attempt to interoperate and communicate with. Indeed, as IoT devices become more ubiquitous, the bandwidth of wireless channels utilized by IoT devices becomes scarcer.

While wireless sensor network (WSN) are being enabled by the increasing availability of interconnected things, data management is a prerequisite to make sense of the data by directing the data flow and computation among the various devices in the network, or system. Data transfer in IoT may be driven by M2M communications that differ markedly from that in the conventional human-to-human (H2H) internet. This lack of unified abstraction in M2M networks complicates developing and deploying M2M/IoT applications which can allow a large amount of devices to connect with one another. When large numbers of WSNs are deployed, management of data flow can be a complex and demanding undertakings, requiring in some cases substantial domain knowledge in communications.

In some implementations, M2M/IoT data management, including determining the proper sources and destinations of the various data produced by collections of IoT devices, can be addressed by abstracting the individual devices through a group computing framework. An abstraction of grouping can help facilitate efficient data flow by group casting, instead of throwing the data in a forceful way by broadcasting. A cast-converge programming model can be implemented that formalizes the group computing pattern of performing a transformative computation over a set of correlated records in the (group) cast phase, with each entity (e.g., each device or each device in cooperation with a respective backend (e.g., cloud-based) service) then performing decision making tasks over aggregated data in the converge phase. In order to make data flow transparent to developers and end users, the cast-converge model can define re-usable criteria (or rules) for determining (on-the-fly) group membership, instead of having developers hard-code group memberships for each application. Further, each entity can consume the data to make real time decisions depending on their respective applications/purposes or role within the application, among other features. Such a programming model can remove technical communication demands from the developer and make development of IoT applications and services more efficient, among other example advantages.

Figure 2:
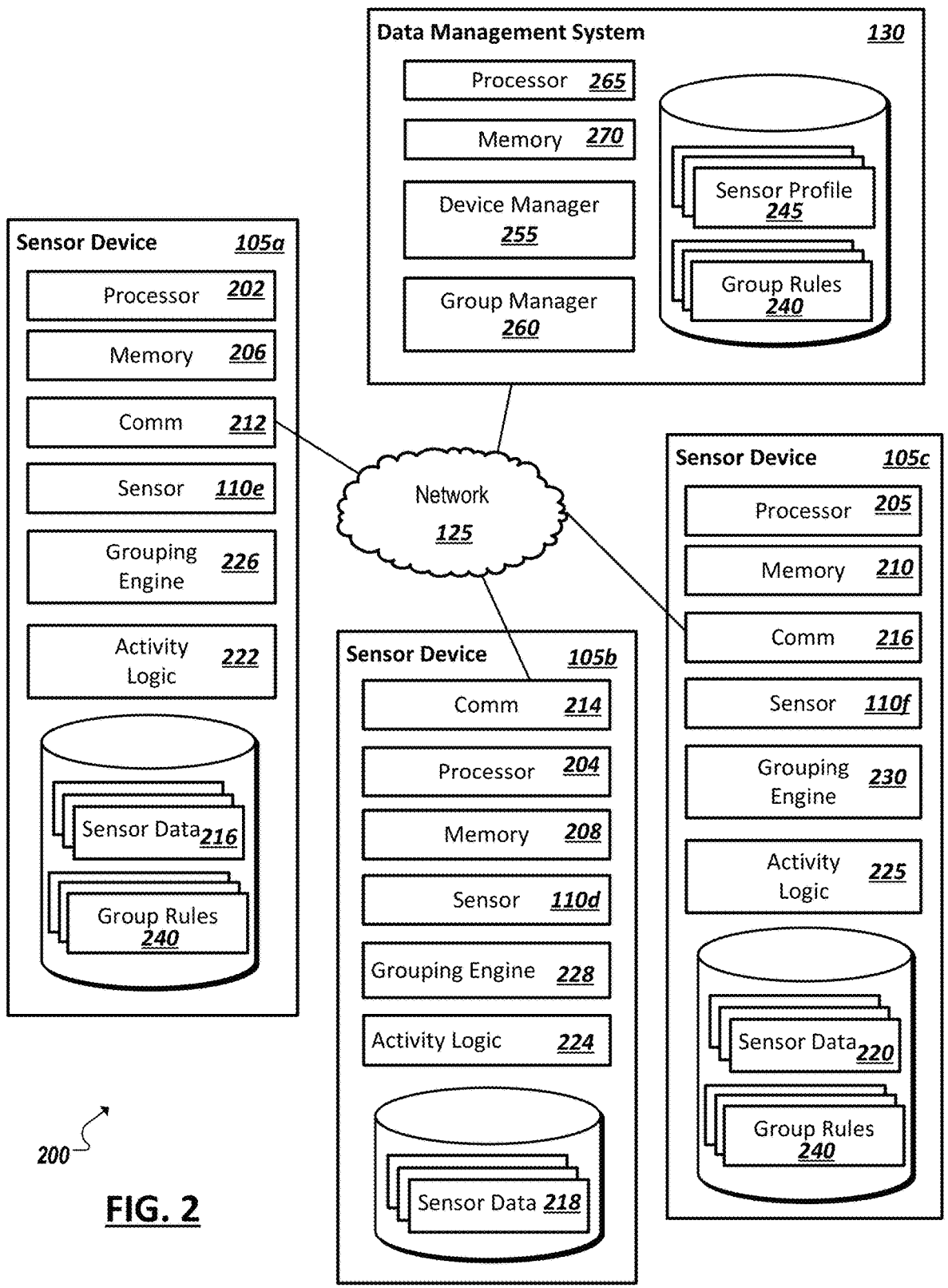
FIG. 2 illustrates an embodiment of a system including an example data management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple sensor devices (e.g., 105a-c) communicating wirelessly over a network 125. In some implementations, a data management system 130 can also be provided to support interoperation of the sensor devices 105a-c. Each of the sensors 105a-c can include one or more respective processing apparatus (e.g., 202, 204, 205) and one or more computer memory elements (e.g., 206, 208, 210) that can be used together with logic implemented in software and/or hardware to implement one or more additional components of the sensor devices 105a-c. For instance, each device 105a-c can have a wireless communication module (e.g., 212, 214, 215) to enable wireless communication over networks (e.g., 125) using one or more different technologies, including WiFi, Bluetooth, Near Field Communication (NFC), Z-wave, among other examples. Further, each sensor device 105a-c can include one or more sensors (e.g., 110f-d) to measure various characteristics of their environment and generate sensor data (e.g., 216, 218, 220) identifying values of the characteristics observed by the sensor(s).

In some implementations, two or more of the devices (e.g., 105a-c) in a system can interoperate to achieve a certain result. Such interaction may be in accordance with activity logic (e.g., 222, 224, 225) provided on the device. Activity logic can facilitate the functionality of the device, including the collection of information (using sensors (e.g., 110d-f), interactions with the device's environment or user, interactions with a backend service or other device, among other examples. An IoT application can leverage the functionality and sensing capabilities of a collection of sensor devices (e.g., 105a-c) to bring about a certain result, goal, or purpose. Interoperation of devices (e.g., 105a-c) in an application can involve the sharing of data between the devices. However, absent explicit programming to define, ex ante, the types of other devices with which each device is to interact with, devices may be unaware of which other devices they are to send data to or receive data from. Further, as the devices in the system communicate utilizing wireless communication (e.g., using an antennae and receiver in communications module (e.g., 212, 214, 216)) data is ordinarily sent by effectively broadcasting a signal embodying the data to all other devices within range of sender. Accordingly, to allow devices to interoperate in a more organized manner and filter out those communications that are irrelevant to the device, each device can determine which other devices in the system are in the same "group," such that the devices are to interoperate in connection with one or more IoT applications.

In one example, rather than groups being defined manually by users, computer-implemented grouping engines (e.g., 226, 228, 230) can be provided to allow each device to automatically determine (e.g., without intervention or live assistance of a user) what group(s) the device "belongs to" within certain context and what other devices in the environment also belong to the same group. In one example, sensor devices (e.g., 105a-c) can broadcast data that includes one or more identifiers. From the identifiers, the sensor devices, either independently or with the assistance of another system (e.g., a backend data management system 130) can determine which of these other devices are also included in the group. The sensor device can then ignore data received from other devices that the sensor determines do not fall within the same group(s). In one example, the identifiers received from the other devices (e.g., in a header or other part of the signals broadcast by the other devices) can be used to identify one or more attributes of the sending device. From these attributes, a grouping engine (e.g., 226, 230) can access grouping rules (e.g., 240) defining criteria for devices to be grouped within each of a set of available groups and assess the received attributes according to this criteria to determine if the sending device belongs in one of the groups, and more particularly, in one of the groups in which the receiving device is also a member. In some instances, grouping logic can be distributed, with a grouping engine (e.g., 228) local to a device (e.g., 105b) utilizing the assistance of a service (e.g., a group manager service 260 hosted by data management system 130) to determine how each of the other devices within range of the device are to be grouped. For example, upon receiving an identifier from another device (over a wireless signal), the receiving sensor device (e.g., 105b) can query a remote service (e.g., 260) for the group to which the sending device belongs. In such an instance, the query may identify the received attributes or simply a unique device identifier (from which the service can derive the corresponding device's attributes) and the group manager service 260 can assess group rules 240 and potentially also sensor device profile data (e.g., 245) (e.g., outlining the individual attributes of various instances or types of sensor devices in a universe of sensor devices) corresponding to the identified device, to return a query result to the requesting sensor device (e.g., 105b). The query result can identify one or more groups determined as corresponding to the other device (which was the subject of the query), from which the requesting sensor device (e.g., 105b) can determine the groups. In other instances, a sensor device can determine groupings autonomously (but consistently with other grouping engines, group managers, and other logic used to determine groupings for a system), without the aid of outside logic (e.g., group manager 260 of data management system 130).

In one example, a data management system 130 can be provided to assist in defining IoT groups and corresponding group rules. Additionally, the data management system 130 (e.g., through group manager 260) can assist devices in determining which of their surrounding devices correspond to which groups. In one example, a data management system 130 can include one or more processor devices (e.g., 265) and one or more computer memory elements (e.g., 270), as well as other components, such as device manager 255 and group manager 260. A device manager 255 can allow the data management system 130 to define and update device profile data 245 (e.g., as device functionality changes or new devices are developed and recognized) to describe the various devices that may be encountered within IoT systems. The group manager 260 can utilize device profile data 245 in some implementation to determine one or more device attributes to assess against group rules 240. For example, group manager 260 may, in some instances, receive a device identifier and identify corresponding device profile data 245 outline attributes of the corresponding device. These attributes can be used by the group manager 260 (together with potentially other attributes advertised by the device during operation) to determine the group(s) in which the corresponding device belongs.

In conventional systems utilizing the concept of device groups, the set of correlated entities (e.g., the specific combination of individual devices, device types, etc.) are specified by users and/or developers manually. Such manual configuration is generally not reconfigurable and limits the flexibility and potential development of corresponding IoT systems and applications. For example, the protection of a smart power grid from failures may involve frequent and continuous reconfigurations, with each reconfiguration potentially changing the grouping definitions and the way data flows within the system. Conventionally, the reconfigurations are coordinated manually by experienced systems operators. On the other hand, the automated abstraction of groupings assessed by computing logic (e.g., 226, 228, 230, 260) according to pre-determined (and globally reconfigurable) criteria, may facilitate seamless communications among things (i.e., connected devices) in an IoT system.

The paradigm for communication with an IoT system can be simplified using group computing abstractions. Devices can broadcast, or "cast", sensor data (e.g., 216, 218, 220) to effectively all devices within range of the communication. Based on the groupings determined by the devices, group computing abstractions can filter out (or ignore) for each device those communications received from devices outside of the device's group automatically without administrative burden to users. Data received from devices within the group, however, can be collected (e.g., and added to sensor data 216, 218, 220) or "converge" at each device in the group. The respective activity logic (e.g., 222, 224, 225) of each sensor device (e.g., 105a-c) can then consume the converged data to determine events and trigger additional activities to be performed by the sensor device (e.g., using the same or other activity logic 222, 224, 225) based on the converged data received from other devices in the group.

While FIG. 2 illustrated one example of a system including an example data management engine, it should be appreciated that the system shown in FIG. 2 is provided as a non-limiting example. Indeed, a variety of alternative implementations can likewise apply the general principles introduced in FIG. 2 (and elsewhere within the Specification). For instance, functionality of the data management engine and one or more of the sensor devices can be combined. In some instances, the data management engine may include or be provided in connection with one of the sensor devices in a collection of sensor devices (e.g., with the sensor device having data management logic serving as the "master" of the collection). Indeed, in one example, the data management engine can be implemented by pooling processing resources of a plurality of the sensor devices. Further, applications can utilize the combined processing power of the sensor devices in a group. In yet another alternative example, the varied components of a data management system can be provided by multiple different systems hosted by multiple different host computers (e.g., rather than on a single device or system), among other alternative examples.

Figure 3:
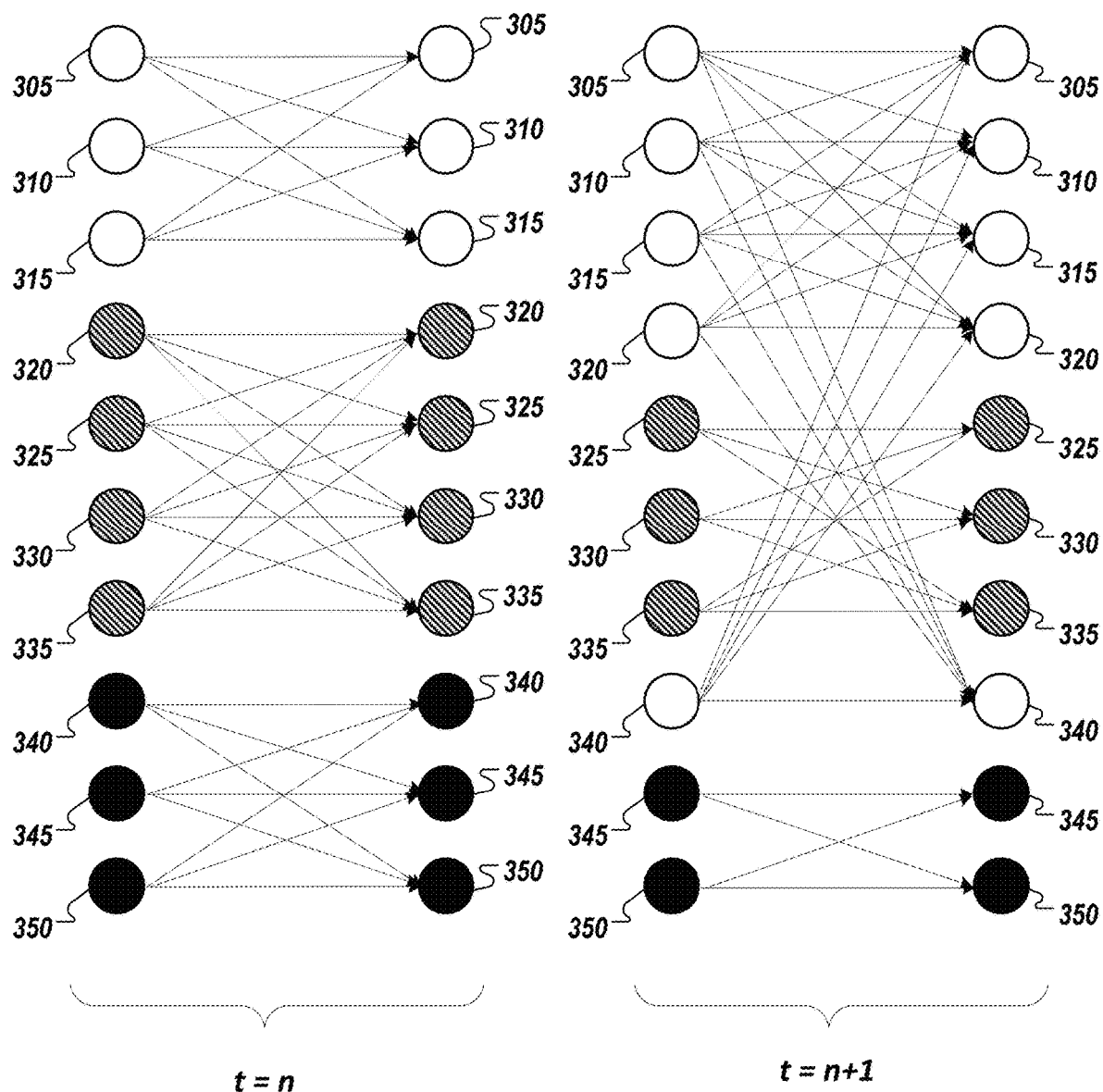
FIG. 3 illustrates a representation of a casting and converging of data in an example grouping.

Turning to FIG. 3, a simplified block diagram 300 is shown illustrating a representation of cast and converge communications involving groupings of sensor devices in an example environment. A group is a number of things, or devices, that are related in some way. For example, devices in a space can be correlated in a conventional home environment. Vehicles with a same destination undergoing similar motions can likewise form a group sharing common interests—traffic congestion along the route. Grouping can serve as a powerful form of abstraction that is both easy to conceptualize, easy to configure, and easy to apply to a variety of different M2M/IoT applications.

Through device grouping, device data broadcasts can effectively transform into multicasts in accordance with each device filtering out data received from devices outside the grouping. By dedicating processing resources to only those communications within the group, energy consumption can be dramatically decreased. These energy savings can be particular valuable in IoT systems where it is not unusual for devices to have diverse computational capability and battery capacities. In traditional systems, broadcasts are received in the physical layer and passed up the stack to the application layer for filtering of message by the application or even the end user. In one implementation, groupings defined for a device can allow filtering of received broadcast messages to be effectively transformed into multicast messages (according to the group) by implementing group computing logic as low as the data link layer (e.g., MAC layer), allowing resources of an IoT device to be reserved to handle targeted communications and thereby process more relevant incoming data, among other example advantages.

In the example of FIG. 3, a collection of devices 305, 310, 315, 320, 325, 330, 335, 340, 345, 350 in an environment can each transmit signals, wirelessly, to all other devices in the collection. The signals can include identifiers that each receiving device can use to determine the group in which the transmitting device belongs. For instance, at a first instance or period of time t=n, devices 305, 310, 315 can be determined to be in a first group, devices 320, 325, 330, 335 in a second group, and devices 340, 345, 350 in a third group. Attributes reported by the respective devices can be compared against rules defined for each of a library of defined groups. Some of the attributes can be static while other attributes can change over time or depending upon the context or environment in which the device is used or found. For instance, at a later time t=n+1, attributes of devices 320 and 340 may change. Signals sent by devices 320 and 340 can be used to identify the changes to the devices and result in devices 320, 340 being determined to be in the first group.

Groups can be defined, in some implementations, according to categories of rule that consider device attributes relating to proximity, similarity, and closure. The rules can be driven by the purposes of defined application (i.e., rules can be application-specific). Indeed, an IoT application can define the group to which the application is to apply by defining corresponding grouping rules. Proximity can refer to attributes of the device relating to space and time, such as latitude, longitude, altitude, indoor metric location, semantic location, etc. For example, a rule of metric location can be used in a home automation IoT application to relate sensor nodes that are within proximity to one another. Similarity can refer to attributes of the device that are space and time derivative, such as similarity in semantic location, similarity in magnitude/orientation in motion, etc. For example, in smart traffic control IoT applications, vehicles in a proximity are not necessarily of interest to one another unless they are undergoing same or orthogonal motion directions (i.e., traveling with or along the same path as other devices). Closure can refer to attributes of the device that relate to the goal, destination, or purpose of the device. For example, in adaptive navigation IoT applications, information exchange among users sharing the same destination can effectively help reinforce the route to the destination (e.g., for fleet management, vehicle caravan, taxi, and other application examples). A group defined by criteria can constitute an equivalence relation that is symmetric, transitive, and reflective. This can imply that a grouping corresponds to a partition in mathematics.

As shown in FIG. 3, a cast-converge paradigm of group computing can be applied. Casting is the process of distributing data collected by a particular device to all other devices within the same group(s). Converging is the process of consuming and reasoning of the data to perform one or more actions (among the group of devices) in accordance with the design and function of the corresponding IoT application(s).

In some implementations, signals can be cast with the data collected by sensors of the sending device and further include the identifier(s) to be used to determine the group(s) to which the sender belongs. For instance, a particular device can periodically generate data reporting findings of its sensors and broadcast this data to all other devices within range of the particular device. The signals used to send this data can, in some implementations, also include the identifier(s) of the particular device. Other devices receiving these signals can first determine, from the identifier, if the particular device is included in one of their groups. If the receiving device and particular device are in the same group, the receiving device accepts, or converges, the data with other data received from other devices within the same group. On the other hand, if the receiving device determines that the particular device is not within one of its groups, the receiving device can ignore, or dispose of, the data received from the particular device.

As noted, upon determining that the data is from a member of the receiving device's same group, the receiving device can accept, or converge, the data. Data received from other devices outside the receiving device's group can be ignored, resulting in the effective multicasting of data within each group, as illustrated in FIG. 3. Further, as group assignments change, such as shown in FIG. 3, the change can be automatically detected and data flows adapted accordingly. During the converge phase, each sensor device can collect all of the data reported by all other devices in their group and then utilize the specific activity logic of the device to derive a result from the data. In some cases, the devices can reach the same result—such as a determination that a threshold or other condition has been met to take further action as a group (e.g., to perform a particular activity utilizing the collection of devices, to take additional readings as a group, etc.). In other cases, the devices can utilize the data received from the other devices in the performance of the device's specific functions. In some cases, one or more of the devices in the group can report at least a portion of the received data, or a result generated by the device from the collected data, to a backend service for further processing, device orchestration by the backend service, presentation to a user, generation of another alert or other event, etc. As an example, average speed reported in a proximity by all cars going toward a general destination or direction can be utilized to develop an alert or route recommendation (e.g., to help a user determine whether or not to take a detour), among other examples.

Figure 4:
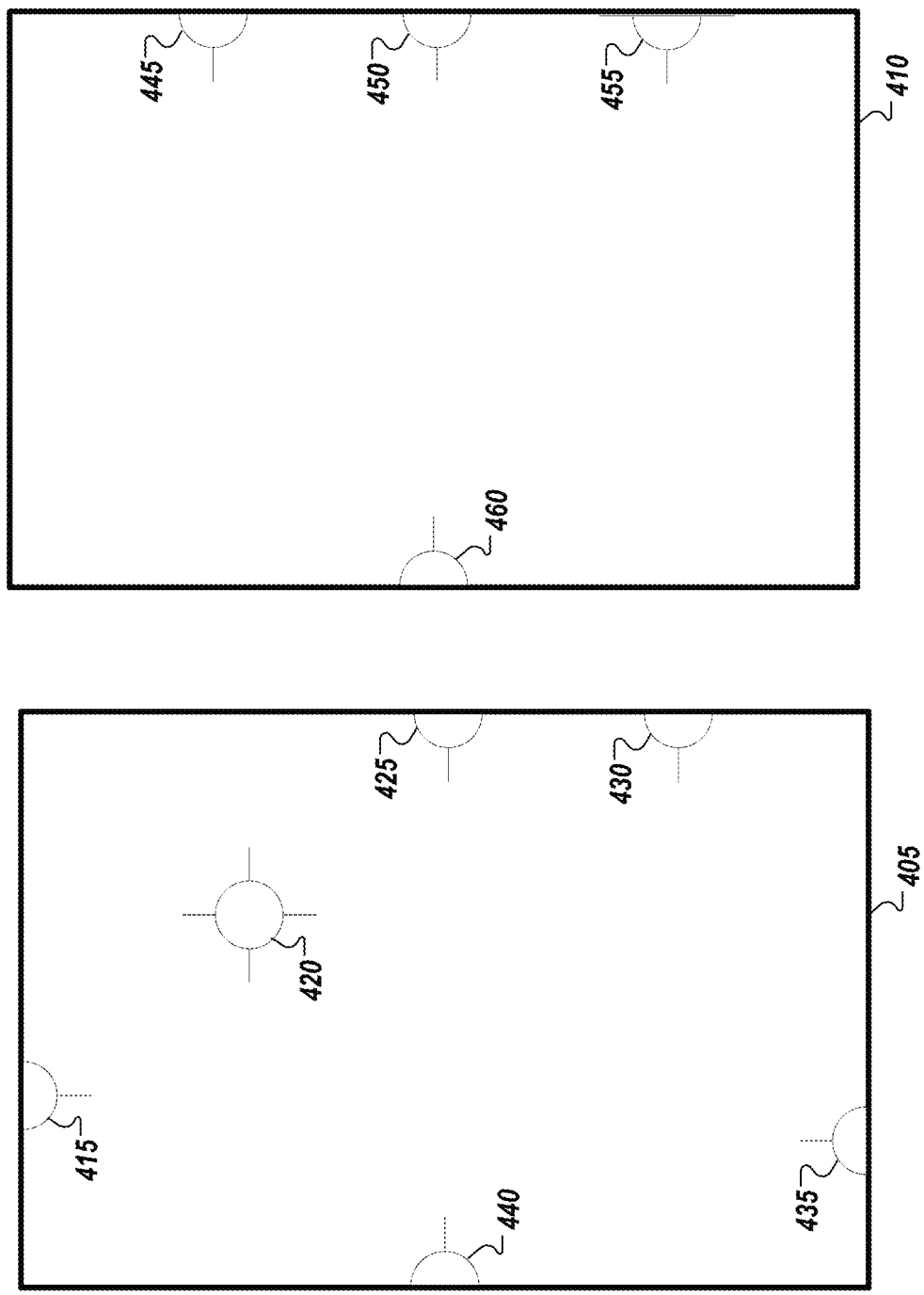
FIG. 4 illustrates a representation of a first example system including multiple different sensor devices.

Turning to FIG. 4, a simplified block diagram 400 is shown illustrating a first example of an IoT system for which one or more IoT applications can be developed and deployed. Two neighboring dwellings 405, 410 are represented. Each of the dwellings 405, 410 can be equipped with and/or house one or more sensor devices (e.g., 415, 420, 425, 430, 435, 440, 445, 450, 455, 460). The sensors may include static or fixed sensors, such as lighting sensors, automated light switches, a smart thermostat, temperature controls, movement sensors, other devices for use in home automation, among other examples. The devices may also include mobile sensor devices, such as a smartphone, smartwatch, or other handheld or wearable controller or monitor (e.g., 420). For IoT systems and applications utilizing a group of devices that are static (or otherwise not likely change), frequent performance of grouping functions (i.e., to determine which other devices are included in a device's same group) may be unnecessary. For instance, a grouping function, in accordance with some IoT applications, may be performed only when a new device or change to existing device is detected. For instance, when a new device enters the space, it may send data prompting the performance of the grouping function. Alternatively, if a device recognizes that attributes (relating to its existing grouping) change, it can send a signal to notify other devices. On the other hand, if devices are moving or changing attributes more regularly, grouping functions can be configured to be formed according to an appropriately frequency. In some cases, a grouping function can be performed every time data is to be received from another device. In other cases, grouping functions can be performed less frequently (e.g., every few minutes, hourly, etc.).

Home appliances and other household IoT devices may be heterogeneous. They may also be more likely to be static. In the example of FIG. 4, a grouping function can be performed to determine which devices are in included in a group corresponding to an application that is to be performed with respect to a particular dwelling (e.g., 405). Some devices (e.g., 460), however, maybe lie outside the dwelling 405, but may be within range of devices (e.g., 415, 420, 425, 430, 435, 440) that are within dwelling 405. To determine grouping, each device may receive a signal that includes one or more identifiers, from which attributes of the sending device can be determined. In some cases, the identifiers may explicitly identify one or more particular attributes of the sending device. In this example, the attributes may include a geopositional or other positional attribute, a device type attribute, a semantic location attribute, signal strength (e.g., for a WiFi, Bluetooth, ZigBee, or other signal), network topology (e.g., ZigBee, 6LoWPAN), among other examples. From the attributes, and a set of rules sets for the group, the devices can determine that at least a subset of the devices in dwelling 405 are in the same group. The devices can cast data to the other devices in the group, with each device receiving the data. At least some of the devices in the group can converge and process the data to perform an action. For instance, an automated light switch may receive data from a light sensor and movement sensor and turn on/off one or more lights in the dwelling. Another group (and corresponding rules) can be defined for another application to include devices that can be used together to manage temperature and HVAC functions of the dwelling, and still another group (and corresponding rules) can be defined for use in managing power within the dwelling (e.g., by turning on/off appliances, switching on alternative power sources, etc., among other example applications and groups.

Outlined below is pseudocode of one simplified example IoT application for controlling lights within a dwelling:

```
// LIGHT SENSOR
// Grouping criteria
C = { PROXIMITY_IN_SEMANTIC_LOCATION }
// Perform grouping once, assuming home environment is static.
G = group(C)
// Main loop
while True:
    s = read_from_light_sensor( )
    cast(G, s)
    // NO CONVERGE FUNCTION FOR LIGHT SENSOR
// LIGHT SWITCH
// Grouping criteria
C = { PROXIMITY_IN_SEMANTIC_LOCATION }
// Perform grouping once, assuming home environment is static.
G = group(C)
// Callback function
function consume(D:DataArray)
    for d:Data in D:
        if d < 5:
            return True
    return False
// Main loop
while True:
    // NO CAST FUNCTION FOR LIGHT SWITCH
    r = converge(G, consume)
    if r:
        turn_on_the_light( )
    else:
        turn_off_the_light( )
```

Figure 5:
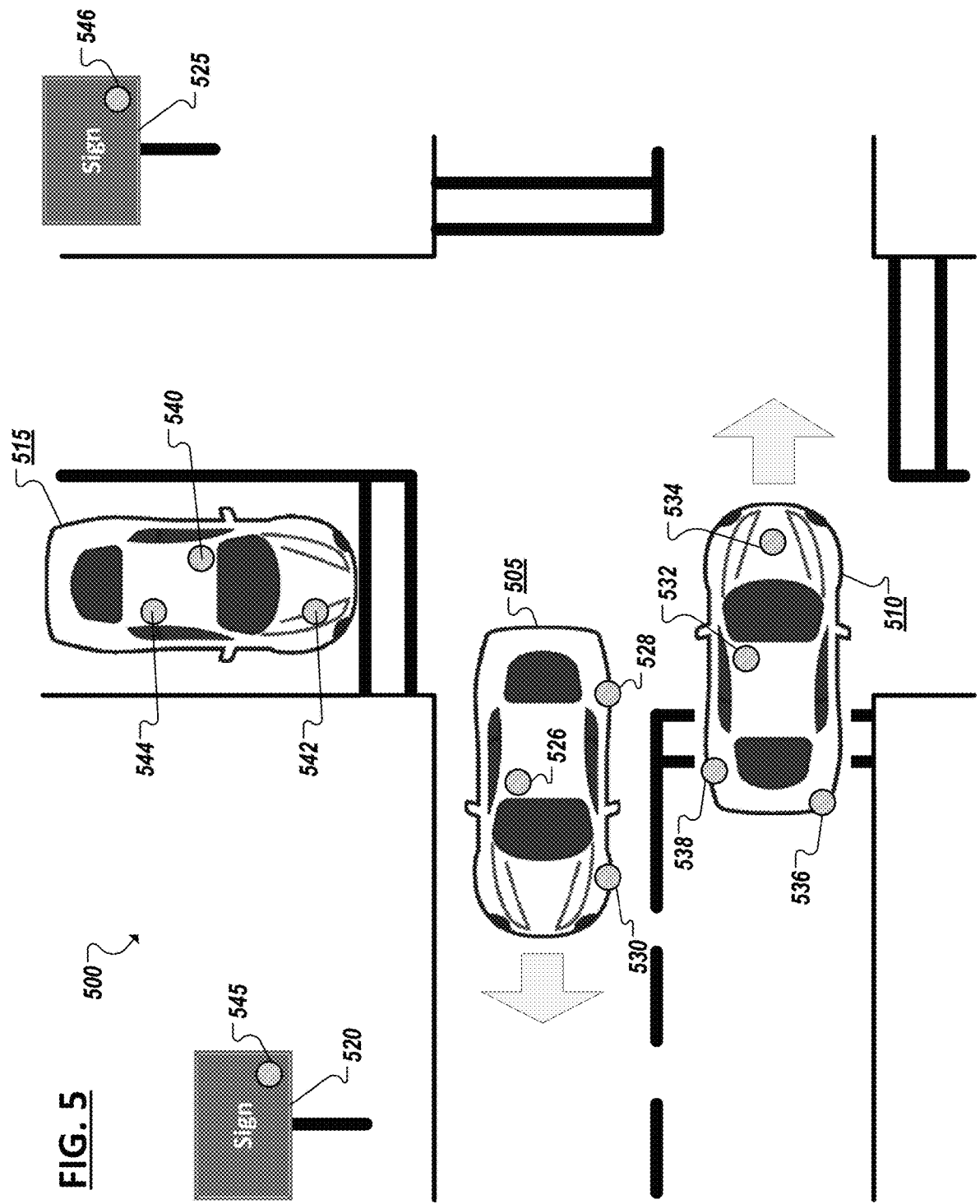
FIG. 5 illustrates a representation of a second example system including multiple different sensor devices.

Turning to FIG. 5, a block diagram 500 is shown illustrating another potential IoT system involving roadways with multiple vehicles (e.g., 505, 510, 515), road signs (e.g., 520, 525), light posts, traffic lights, guardrails, buildings, bridges, and other features. In this example, in-vehicle and on-road sensor devices (e.g., 526, 528, 530, 532, 534, 535, 536, 538, 540, 542, 544, 545, 546) are provided. Rather than being static devices, however, given the nature of moving automobiles, the devices can change position and state, both spatially and with relation to the other devices. For example, some of the devices (e.g., 545, 546) may be static, or stationary, such as devices mounted on road signs (e.g., 520, 525), telephone poles, traffic lights, etc. However, in relation to moving automobiles (e.g., 505, 510) these stationary devices nonetheless move in and out of range of passing automobiles, potentially affecting the groups with which they are associated. Other devices (e.g., 526, 528, 530, 532, 534, 535, 536, 538, 540, 542, 544) may be mounted on or included in vehicles (e.g., 505, 510, 515) and characteristically move with the vehicle.

As noted above, attributes can be proximity-based, similarity-based (e.g., similar in movement), and closure-based (e.g., similar in purpose). Such attributes can be used to determine when another group is moving together with (e.g., in the same car or in a leading, following, or neighboring car on the same road) other devices in a group. For example, while each of the sensor devices may (at the snapshot in time illustrated in the example of FIG. 5) may be within range of the other, a group function can determine which of the devices are to collect and/or use data in connection with an application directed to assist a particular automobile (e.g., 505) or its user. Devices that send signals interpretable to express that the devices are not only in the same proximity of, but also moving in the same direction (and the same speed) of and have the same purpose and/or destination, can be determined to belong to the group of devices for use with a particular application for the automobile, such as an IoT application to provide vehicular safety features or solutions for the automobile.

For instance, in the example of FIG. 5, a device 526 can determine that it belongs in a group that also includes devices 528, 530 (within the same car 505), but also a device 545 on nearby road sign 520 approached by the car 505. Device 526 can determine that these other devices (e.g., 528, 530, 545) belong in this same group from attributes derived from signals received from each of these devices. Other devices (e.g., 532, 534, 535, 536, 538, 540, 542, 544, 546) within range of device 526 may also signal device 526 to indicate their respective attributes. However, upon applying the group's rules and criteria (and based on the values of the attributes reported by the other devices (e.g., 532, 534, 535, 536, 538, 540, 542, 544, 546), device 526 can determine that these devices fall outside the group. For instance, attributes reported by device 534 may indicate that the device 534 is moving in a direction opposite device 526, causing device 534 to fall outside the particular group (but potentially within another group corresponding to devices (e.g., 532, 534, 535, 536, 538) within automobile 510). Devices (e.g., 540, 542, 544) within car 515 may also be determined not to fall within either of these groups, because attributes reported by the devices indicate that they are in a car that is not moving (e.g., it is parked or stopped), oriented orthogonal to the moving cars, or other example attributes that disagree with the groups' respective rules and criteria. Static sensor 546 may be determined to fall outside of a group corresponding to application for car 505 because the other devices in the group are moving away from the corresponding road sign. At an early grouping function, device 546 may have been included in the group (e.g., as car 505 approached the sign 546). Indeed, grouping functions can be performed (in accordance with a defined application) at differing frequencies to account for changes in state or attributes of various devices within each group. For instance, a grouping function can be performed, in the example of FIG. 5 multiple times per minute or opportunistically to account for changes within the environment of the moving automobile(s), among other examples. Further, group membership can different from one device to another, even when the devices are instances of the same device type and/or run the same code. This may be due to such factors as data loss, different data retention policies, and other factors.

Upon determining which devices belong to the same group as a particular device, the particular device (e.g., 526) can receive and converge data from the other devices in the group and perform one or more calculations and other functions to determine whether a result, trigger, or event is triggered. Such an event can be jointly determined by each of (or at least two or more of) the devices in the group, with each device reaching a similar result. Additional and varying functionality of the specific devices can thereby also be triggered based on the event(s) and data received within the group.

Outlined below is pseudocode of another simplified example IoT application for providing vehicular security to a corresponding automobile. For instance, the IoT application can attempt to ensure against collision from predicting time to collision. Once the time to collision is shorter than a certain threshold, an action in response to the potential collision is issued (e.g., alert the driver and decelerate the vehicle):

```
// VEHICLE
// Grouping criteria
C = { PROXIMITY_IN_LATITUDE,
      PROXIMITY_IN_LONGITUDE,
      PROXIMITY_IN_ALTITUDE,
      SIMILAR_IN_MOTION_DIRECTION
      ORTHOGONAL_IN_MOTION_DIRECTION }
// Callback function
function consume(D:DataArray)
    for d:Data in D:
        lat = d.latitude
        lng = d.longitude
        alt = d.altitude
        dir = d.orientation
        if time_to_collide(lat, lng, alt, dir) < 3:
            return True
    return False
// Main loop
while True:
    // Perform grouping every time since environment is dynamic.
    G = group(C)
    d = read_from_GPS( )
    cast(G, d)
        r = converge(G, consume)
        if r:
            alert_and_brake( )
```

The cast-converge paradigm introduced herein can also assist in expediting the development of M2M/IoT applications whose challenges usually are how to effectively distribute the data in highly dynamic networks. In response to the complexity, the cast-converge framework can allow developers to express computations they were trying to perform while leaving the details of data management transparent to developers and end users. For instance, the framework may hide every detail of data flow, and developers basically only have to specify the grouping/casting criteria/rules, e.g., location, motion direction, altitude, contacts, etc., for the cast phase, and the converge functions to be performed (e.g., to process the received data) in the converge phase.

Grouping criteria can be defined arbitrarily as long as grouping is an equivalence relation. In some examples, machine learning (e.g., active learning and learning by example) can be used for a computer to reason about the changes in sensing and actuating nodes and, as a result, infer sophisticated grouping.

Given that a set of criteria is specified, grouping can be determined online, and then used in the CastConverge paradigm, which can be expressed as:

```
function group(C:Criteria)
    e = device_unique_identifier
    G = query(e, C)
    return G
``` where the group function takes as input a set of criteria, which can be assessed locally and/or with help of a cloud-based or other remote computer (e.g., by sending a query identifying the other device(s) encountered by the device, or particular attributes of the other device as shared with the device, from which the remote controller can assist in determining the other device's group(s)). In one example, a backend service, during a grouping function, can be queried by sensor devices in a system and output a collection of universal identifiers identifying which devices fall into the same group. Further, based on grouping, the way data flow among entities can be formalized into two-phase iterations—cast and converge.

Cast may involve a device performing multicasting to distribute the data of interest to all entities within the same group, which can be expressed as follows:

```
function cast(G:Group, d:Data)
    foreach e:Entity in G:
        send(e, d)
```

Converge may be the process of consuming all the incoming data and generating actionable insights where possible. The consume function can be a virtual function that must be overridden whose definition is driven by the problem to be solved. The converge function is shown below:

```
function converge(G:Group, consume:function)
    D = { }
    foreach e:Entity in G:
        d = recv(e)
        D = add(D, d)
    return consume(D)
```

The cast-converge paradigm can simplify development of IoT applications that involve intercommunication and data sharing between devices. For instance, (rapid) prototyping of M2M/IoT applications can be enabled through the cast-converge paradigm with minimal domain knowledge in communications and data/link management. Most M2M/IoT application and service logic can otherwise be straightforward, with the cast-converge paradigm (implemented, for instance, as an API) ensuring against domain knowledge or technical expertise being an obstacle to realizing various innovative ideas. Under the theoretical framework of group computing, grouping is a means to determine correlated records from distinct entities, and the cast-converge paradigm can be used to facilitate and expedite the development of various M2M/IoT solutions. Indeed, in some instances, a developer may resolve communication and data/link management for an application implemented according to the cast-converge paradigm by defining grouping rules/criteria for the specific types of devices that are to be included to implement the application or service. The cast-converge paradigm can thus serve as a generic framework to solve real world M2M/IoT problems.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 6:
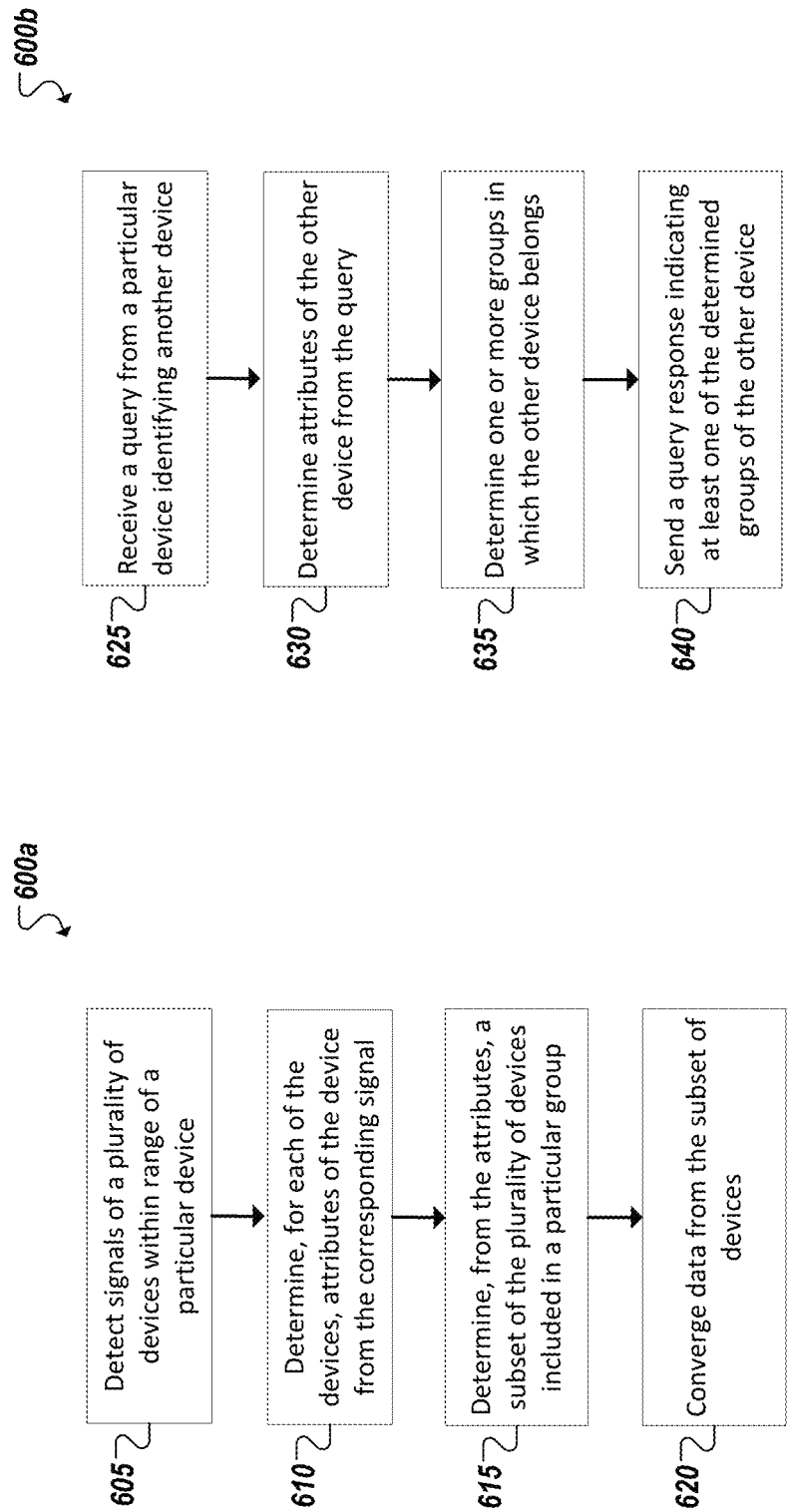
FIGS. 6A-6B are flowcharts illustrating example techniques for managing data in a system.

FIGS. 6A-6B are simplified flowcharts 600a-b illustrating example techniques for facilitating data transfers within an M2M/IoT system. For instance, in FIG. 6A, signals can be detected 605 at a particular device from multiple other devices within range of the particular device (e.g., within signal range of a wireless communication antennae of the particular device or within outreach of an Internet connected device in a centralized cloud based implementation). Attributes of each of the multiple devices can be determined 610 using the corresponding signal. In some cases, these attributes can be determined directly and independently by the particular device. For instance, the attributes can be specified in the signal sent by the respective other device. In other instances, the receiving particular device can utilize a remotely-hosted service to assist in determining at least some of the attributes of the other device(s) from identifiers included in the signals. Further, a subset of the multiple devices can be determined 615, from the determined attributes, to be properly included in a particular group to which the particular device also belongs. Each of the particular device and any of the other devices may be members of multiple different groups simultaneously based on their individual attributes. Further, the attributes of an individual device can change depending on the operational context of the device (e.g., its location, its user, its state, its present use, etc.). Accordingly, at a first instance in time, a device may be determined to not be included in a given group, but after a change in operational context (and attributes) may later be determined to be included in the group. Data transfers can be conditioned upon the data originating from another device determined to be within the particular device's group. Accordingly, data received from the subset of other devices can be collected and processed (or converged) 620 based on the subset of devices being in (one of) the same group(s) as the particular device.

As noted above, backend or remotely-hosted services can assist devices in determining what other devices are also in a group with a particular device. For instance, as shown in FIG. 6B, a backend service can receive a query from a particular device (in a collection of devices), the query reporting one or more signals received by the particular device from multiple other devices. The query may identify attributes of the respective other devices or may delegate the determination of attributes to the backend service. For instance, the backend service may determine 630 at least some of the attributes of at least some of the other devices encountered by the particular device. The attributes can be determined 630 from information included in the query (as collected by the particular device). These attributes can be relevant to group rules maintained for a system. Indeed, the backend service may additionally determine 635 which groups each of the other devices belongs to based on the determined attributes. The backend service can then send a response 640 to the query to the particular device identifying the determined groups (and/or attributes). The particular device can use the response to determine how to handle data from the various devices within range of the particular device.

Figure 7:
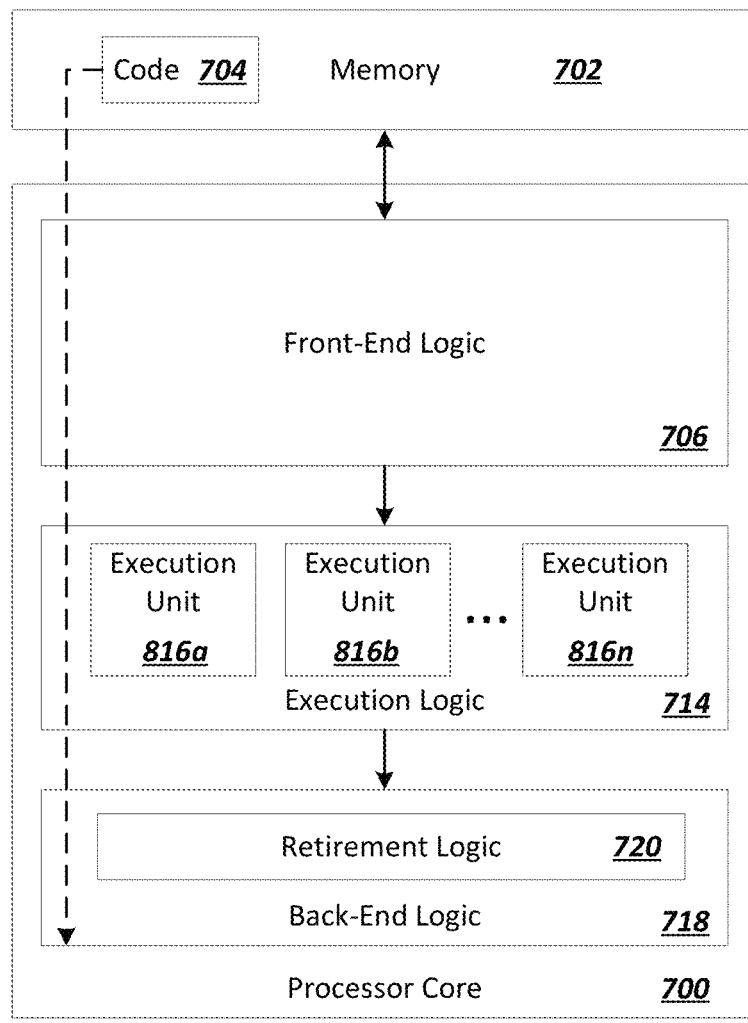
FIG. 7 is a block diagram of an exemplary processor in accordance with one embodiment.
Figure 8:
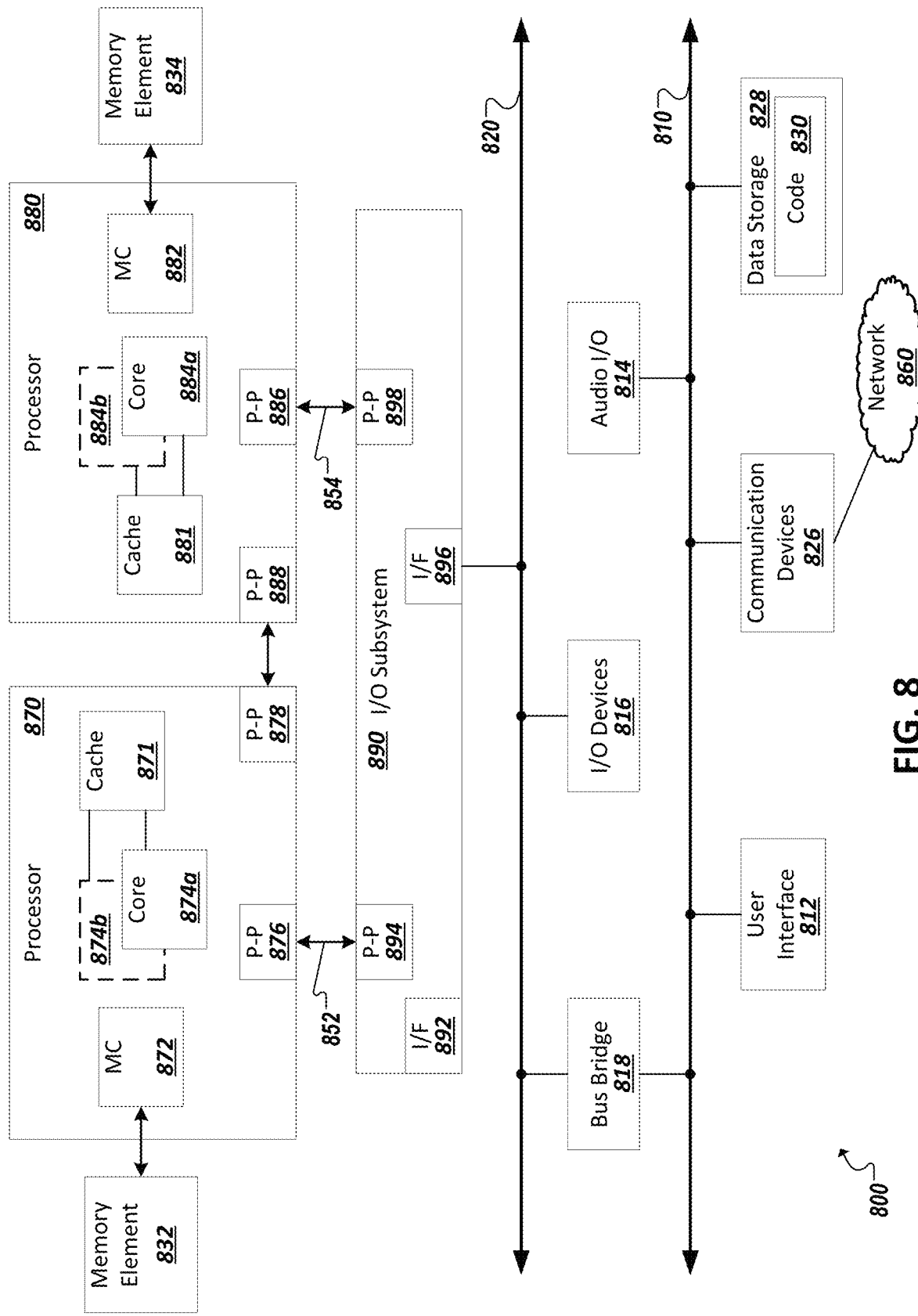
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716*a*, 716*b*, 716*n*, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium, and an apparatus including a device that includes at least one processor, a communications module to receive signals of a plurality of devices within range of the particular device, and grouping logic. The grouping logic can be executable by one or more processors to determine, from each of the signals, a respective identifier for each of the plurality of devices, determine, based at least in part on the identifiers, that a particular subset of the plurality of devices are also included, with the particular device, in a particular one of a plurality of defined groups, and converge data received from the particular subset of devices based on the particular group.

In one example, the device includes at least one sensor to collect environmental information.

In one example, communications module is further to broadcast sensor data generated by the at least one sensor describing at least a portion of the environmental information to the plurality of devices.

In one example, the communications module is further to broadcast a signal including one or more identifiers of the particular device to the plurality of devices, and the plurality of devices are to determine that the particular device belongs to the particular group based on the identifiers of the particular device.

In one example, at least some of the identifiers specify one or more of the attributes of the corresponding one of the plurality of devices.

In one example, determining that the particular subset of devices is included in the particular group includes assessing the attributes of each device against rules including criteria for inclusion in the particular group.

In one example, the grouping logic is further to determine that at least one of the plurality of devices is not to be included in the particular group based on attributes identified for the corresponding device.

In one example, each of the plurality of groups has corresponding rules, and each of the rules is to specify criteria relating to a defined set of attributes.

In one example, the defined set of attributes includes one or more attributes relating to device proximity, one or more attributes relating to device similarity, and one or more attributes relating to closure.

In one example, determining that the particular subset of devices is included in the particular group includes sending a query to a remote service for a first one of the subset of devices, where the query includes at least one of the identifiers determined for the first device from the signal, and receiving a response from the service identifying one or more groups in which the first device is included.

In one example, converging the data includes converging the data from each of the subset of devices with at least some sensor data generated by at least one sensor of the apparatus and processing the converged data to determine a result.

One or more embodiments may provide a method, a system, apparatus, and a machine readable storage to detect, at a particular device, signals of a plurality of devices within a range, determine, from each of the signals, a respective identifier for each of the plurality of devices, determine that the particular device is included in a particular one of a plurality of defined groups, determine, based at least in part on the identifiers, that particular subset of the plurality of devices are also included in the particular group, and converge data received from the particular subset of devices.

In one example, a result is generated from the converged data.

In one example, an action is performed, using the particular device, based on the result.

In one example, the action is performed together with actions performed by at least one other device in the group based on the converged data.

In one example, the plurality of devices include Internet of Things (IoT) devices.

In one example, determining groupings is repeated corresponding to a frequency.

In one example, it can be determined that the particular device is included in a different one of the plurality group at a subsequent time, and data from a different set of devices also determined to be in the different group can be converged at the particular device at the subsequent time.

One or more embodiments may provide a system including at least one processor device, at least one memory, and a particular end-user device. The particular end-user device can include executable logic to detect signals of a plurality of devices within a range, determine, from each of the signals, a respective identifier for each of the plurality of devices, determine that the particular end-user device is included in a particular one of a plurality of defined groups, determine, based at least in part on the identifiers, that a particular subset of the plurality of devices are also included in the particular group, and converge data received from the particular subset of devices.

In one example, the system further includes the particular subset of devices.

In one example, determining that the particular subset of devices is included in the particular group includes sending a query to a service hosted by a particular system, the query including at least one of the identifiers determined for a first one of the subset of devices, and receiving a response from the service identifying one or more groups in which the first device is included.

In one example, the service can be executable to receive the query, identify one or more attributes for the first device from the query, assess the one or more attributes against group rules defining criteria for the plurality of groups, and determine that the first device is to be included in one or more of the groups including the particular group, based on assessment of the one or more attributes.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine-accessible storage medium with instructions thereon, the instructions executable by a machine to cause the machine to:
    detect, at a particular device, a plurality of signals broadcast by a plurality of devices within a range;
    identify, within each of the plurality of signals, respective identifier data for each of the plurality of devices, wherein the respective identifier data identifies functional capabilities of the respective device;
    determine, at the particular device, that the particular device is included in a particular one of a plurality of defined groups based on the identifier data included in the plurality of signals, wherein the particular group further comprises a subset of devices in the plurality of devices;
    identify sensor data received from the plurality of devices at the particular device; and
    aggregate, at the particular device, sensor data generated by the particular device with the sensor data received from the particular subset of devices based on determining that the particular device is included in the particular defined group.

2. The storage medium of claim 1, wherein the functional capabilities comprise one of a type of sensor on the device or a type of actuator on the device.

3. The storage medium of claim 1, wherein aggregating the sensor data further comprises excluding sensor data received from at least one other device in the plurality of devices based on the other device not being included in the particular defined group.

4. The storage medium of claim 1, wherein the instructions are further executable to cause a machine to generate converged sensor data for the particular group from the aggregated sensor data.

5. The storage medium of claim 4, wherein the instructions are further executable to cause a machine to generate a result from the converged sensor data.

6. The storage medium of claim 5, wherein the instructions are further executable to cause a machine to cause an action to be performed by at least a particular subset of the plurality of devices based on the result.

7. The storage medium of claim 1, wherein the plurality of devices comprises Internet of Things (IoT) devices.

8. The storage medium of claim 1, wherein the instructions are further executable to cause a machine to determine that the particular device is included in a different one of the plurality of groups at a subsequent time.

9. A method comprising:
    detecting, at a particular device, a plurality of signals broadcast by a plurality of devices within a range;
    identifying, within each of the plurality of signals, respective identifier data for each of the plurality of devices, wherein the respective identifier data identifies functional capabilities of the respective device;
    determining, at the particular device, that the particular device is included in a particular one of a plurality of defined groups based on the identifier data included in the plurality of signals, wherein the particular group further comprises a subset of devices in the plurality of devices;
    identifying sensor data received from the plurality of devices at the particular device; and aggregating, at the particular device, sensor data generated by the particular device with the sensor data received from the particular subset of devices.

10. The method of claim 9, wherein the functional capabilities comprise a type of sensor on the device.

11. The method of claim 9, wherein the functional capabilities comprise a type of actuator on the device.

12. The method of claim 9, further comprising generating converged sensor data for the particular group from the aggregated sensor data.

13. The method of claim 12, further comprising generating a result from the converged sensor data.

14. The method of claim 13, further comprising causing an action to be performed by at least a particular subset of the plurality of devices based on the result.

15. The method of claim 12, wherein the plurality of devices comprises Internet of Things (IoT) devices.

16. The method of claim 9, further comprising determining that the particular device is included in a different one of the plurality of groups at a subsequent time.

17. A system comprising:
a plurality of devices;
a particular device to communicate with the plurality of devices over a network, wherein the particular device comprises:
a processor device;
a memory;
a controller, executable by the processor device, to:
detect, at a particular device, a plurality of signals broadcast by a plurality of devices within a range;
identify, within each of the plurality of signals, respective identifier data for each of the plurality of devices, wherein the respective identifier data identifies functional capabilities of the respective device;
determine, at the particular device, that the particular device is included in a particular one of a plurality of defined groups based on the identifier data included in the plurality of signals, wherein the particular group further comprises a subset of devices in the plurality of devices;
identify sensor data received from the plurality of devices at the particular device; and
aggregate, at the particular device, sensor data generated by the particular device with sensor data received from the particular subset of devices based on determining that the particular device is included in the particular defined group.

18. The system of claim 17, wherein the controller comprises grouping logic to define groups in the plurality of defined groups.

19. The system of claim 17, wherein the plurality of devices comprise internet of things (IoT) devices.

20. The system of claim 19, wherein the particular device comprises a gateway within an IoT system.

* * * * *